United States Patent
Galpin et al.

(10) Patent No.: US 12,316,870 B2
(45) Date of Patent: May 27, 2025

(54) METHOD AND APPARATUS FOR VIDEO ENCODING AND DECODING WITH BI-DIRECTIONAL OPTICAL FLOW ADAPTED TO WEIGHTED PREDICTION

(71) Applicant: InterDigital Madison Patent Holdings, SAS, Paris (FR)

(72) Inventors: Franck Galpin, Thorigne-Fouillard (FR); Philippe Bordes, Laille (FR); Edouard Francois, Bourg des Comptes (FR)

(73) Assignee: InterDigital Madison Patent Holdings, SAS, Paris (FR)

( * ) Notice: Subject to any disclaimer, the term of this patent is extended or adjusted under 35 U.S.C. 154(b) by 194 days.

(21) Appl. No.: 17/422,349

(22) PCT Filed: Jan. 10, 2020

(86) PCT No.: PCT/US2020/013026
§ 371 (c)(1),
(2) Date: Jul. 12, 2021

(87) PCT Pub. No.: WO2020/150080
PCT Pub. Date: Jul. 23, 2020

(65) Prior Publication Data
US 2022/0109871 A1    Apr. 7, 2022

(30) Foreign Application Priority Data

Jan. 14, 2019   (EP) ..................................... 19305044
Mar. 7, 2019    (EP) ..................................... 19305267

(51) Int. Cl.
*H04N 19/577*   (2014.01)
*H04N 19/105*   (2014.01)
(Continued)

(52) U.S. Cl.
CPC ......... *H04N 19/577* (2014.11); *H04N 19/105* (2014.11); *H04N 19/137* (2014.11); *H04N 19/176* (2014.11); *H04N 19/184* (2014.11)

(58) Field of Classification Search
CPC .. H04N 19/105; H04N 19/137; H04N 19/176; H04N 19/184; H04N 19/573; H04N 19/577
(Continued)

(56) References Cited

U.S. PATENT DOCUMENTS 11,064,206 B2 *   7/2021   Zhang ................... H04N 19/577
2021/0051342 A1 * 2/2021   Galpin .................. H04N 19/186
(Continued)

FOREIGN PATENT DOCUMENTS

CN   108353186 A    7/2018
EP   3413563 A1    12/2018
(Continued)

OTHER PUBLICATIONS

Chen et al., "Generalized bi-prediction for inter coding", Joint Video Exploration Team (JVET) of ITU-T SG 16 WP3 and ISO/IEC JTC 1/SC 29/WG 11, Document: JVET-C0047, 3rd Meeting, Geneva Switzerland, May 26, 2016, 4 pages.
(Continued)

*Primary Examiner* — Behrooz M Senfi
(74) *Attorney, Agent, or Firm* — Condo Roccia Koptiw LLP

(57) ABSTRACT

Different implementations are described, particularly implementations for video encoding and decoding are presented. According to an implementation, in a method for encoding or decoding a part of an image, at least an equation of the bi-directional optical flow is modified for unequal weights in a weighted prediction of the part of the image. According to non-limiting examples, modifying the bi-directional optical
(Continued)

flow equation comprises bit depth shifting the unequal weights used in the weighted prediction, quantifying the unequal weighs used in the weighted prediction or deriving modified weighs to apply to predictions of the part of the image from the unequal weights used in weighted prediction.

20 Claims, 5 Drawing Sheets

(51) Int. Cl.
  *H04N 19/137* (2014.01)
  *H04N 19/176* (2014.01)
  *H04N 19/184* (2014.01)

(58) Field of Classification Search
  USPC .................................................. 375/240.12
  See application file for complete search history.

(56) References Cited

U.S. PATENT DOCUMENTS

| | | | | |
|---|---|---|---|---|
| 2021/0227211 A1* | 7/2021 | Liu | ........................ | H04N 19/583 |
| 2021/0227250 A1* | 7/2021 | Liu | ........................ | H04N 19/577 |
| 2021/0266595 A1* | 8/2021 | Su | .......................... | H04N 19/70 |
| 2022/0150505 A1* | 5/2022 | Luo | ....................... | H04N 19/176 |
| 2023/0125740 A1* | 4/2023 | Luo | ....................... | H04N 19/159 |
| | | | | 375/240.02 |
| 2023/0179795 A1* | 6/2023 | He | ........................ | H04N 19/463 |
| | | | | 375/240.16 |

FOREIGN PATENT DOCUMENTS

| | | | | | |
|---|---|---|---|---|---|
| WO | WO-2017134957 A1 * | 8/2017 | ........... | H04N 19/105 |
| WO | WO 2017197146 A1 | 11/2017 | | |
| WO | WO-2020069076 A1 * | 4/2020 | ........... | H04N 19/139 |
| WO | 2020/094000 A1 | 5/2020 | | |

OTHER PUBLICATIONS

Chen et al., "Generalized Bi-prediction Method for Future Video Coding", IEEE 2016 Picture Coding Symposium (PCS), Nuremberg, Germany, Dec. 4, 2016, 5 pages.

Alexander et al., "Bi-directional Optical Flow for Future Video Codec", Institute of Electrical and Electronics Engineers (IEEE), 2016 Data Compression Conference (DCC), SnowBird, Utah, USA, Mar. 30, 2016, 8 pages.

Chen et al., "Algorithm Description for Versatile Video Coding and Test Model 3 (VTM 3)", Joint Video Experts Team (JVET) of ITU-T SG 16 WP 3 and ISO/IEC JTC1/SC29/WG11, Document: JVET-L1002-v1, 12th Meeting, Macao, China, Oct. 3, 2018, 37 pages.

Anonymous, "Transmission of Non-Telephone Signals: Information Technology—Generic Coding of Moving Pictures and Associated Audio Information: Systems", International Telecommunication Union, ITU-T Telecommunication Standardization Sector of ITU, Recommendation ITU-T H.222.0, Jul. 1995, 135 pages.

Anonymous, "Series H: Audiovisual and Multimedia Systems, Infrastructure of audiovisual services—Coding of moving video—Information Technology—Generic coding of moving pictures and associated audio information: Video", International Telecommunication Union, ITU-T Telecommunication Standardization Sector of ITU, Recommendation ITU-T H.262, Feb. 2000, 220 pages.

Hashimoto et al., "Non-CE4: Weighted prediction with BDOF and bi-prediction with CU weights harmonization", Joint Video Experts Team (JVET) of ITU-T SG 16 WP 3 and ISO/IEC JTC 1/SC 29/WG 11, Document: JVET-M0067-v1, 13 Meeting: Marrakech, Morocco, Jan. 9, 2019, 6 pages.

Galpin et al., "CE9-related: BDOF-BWA unification", Joint Video Experts Team (JVET) of ITU-T SG 16 WP 3 and ISO/IEC JTC 1/SC 29/WG 11, Document: JVET-N0239, 14th Meeting: Geneva, Switzerland, Mar. 19, 2019, 3 pages.

Chen et al., "Algorithm Description for Versatile Video Coding and Test Model 3 (VTM 3)", Joint Video Experts Team (JVET) of ITU-T SG 16 WP 3 and ISO/IEC JTC 1/SC 29/WG 11, Document: JVET-L1002-v1, 12th Meeting: Macao, China, Oct. 3, 2018, 48 pages.

Anonymous, "Series H: Audiovisual and Multimedia Systems, Infrastructure of audiovisual services—Coding of moving video—Reference software for ITU-T H.265 high efficiency video coding", International Telecommunication Union, ITU-T Telecommunication Standardization Sector of ITU, Recommendation ITU-T H.265. 2, Oct. 2014, 12 pages.

* cited by examiner

METHOD AND APPARATUS FOR VIDEO ENCODING AND DECODING WITH BI-DIRECTIONAL OPTICAL FLOW ADAPTED TO WEIGHTED PREDICTION

CROSS REFERENCE TO RELATED APPLICATIONS

This application is the national stage entry under 35 U.S.C. § 371 of International Application PCT/2020/013026, filed Jan. 10, 2020 which was published in accordance with PCT Article 21(2) on Jul. 23, 2020, in English, and which claims the benefit of European Patent Application No. 19305044.0, filed Jan. 14, 2019, and European Patent Application No. 19305267.7, filed Mar. 7, 2019.

TECHNICAL FIELD

At least one of the present embodiments generally relates to, e.g., a method or an apparatus for encoding or decoding a part of an image, and more particularly, to a method or an apparatus comprising modifying the bi-directional optical flow in inter prediction for weighted prediction.

BACKGROUND

The technical field of the one or more implementations is generally related to video compression. At least some embodiments relate to improving compression efficiency compared to existing video compression systems such as HEVC (HEVC refers to High Efficiency Video Coding, also known as H.265 and MPEG-H Part 2 described in "ITU-T H.265 Telecommunication standardization sector of ITU (October 2014), series H: audiovisual and multimedia systems, infrastructure of audiovisual services—coding of moving video, High efficiency video coding, Recommendation ITU-T H.265"), or compared to under development video compression systems such VVC (Versatile Video Coding, a new standard being developed by JVET, the Joint Video Experts Team).

To achieve high compression efficiency, image and video coding schemes usually employ partitioning of an image, prediction, including motion vector prediction, and transform to leverage spatial and temporal redundancy in the video content. Generally, intra or inter prediction is used to exploit the intra or inter frame correlation, then the differences between the original image and the predicted image, often denoted as prediction errors or prediction residuals, are transformed into frequency-domain coefficients, the coefficients are quantized, and entropy coded. To reconstruct the video, the compressed data are decoded by inverse processes corresponding to the entropy decoding, inverse quantization, inverse transform, and prediction.

FIG. 1 illustrates an exemplary flowchart of the inter prediction process in a codec such as VVC. For instance, the Joint Exploration Model (JEM) and the VVC reference software developed by the JVET (Joint Video Exploration Team) group describe some of the tools associated at each stage of the inter prediction process pipeline of FIG. 1. In VVC codec, several extensions of the bi-prediction of HEVC have been proposed. At least some embodiments further relate to inter-prediction among which 2 particular tools relative to bi-prediction:

Generalized Bi-prediction (GBI) or Bi-prediction with CU level Weights (BCW) wherein the weighting during the blending of the 2 predictions use un-equal weights.
BIO: Bi-directional Optical flow (a.k.a. BDOF).

It is desirable to improve the bi-prediction syntax and process in inter coded blocks compared to existing video compression systems such as HEVC or VVC.

SUMMARY

The purpose of the invention is to overcome at least one of the disadvantages of the prior art. For this purpose, according to a general aspect of at least one embodiment, a method for encoding a part of an image is presented comprising sample-wise refinement using bi-directional optical flow wherein at least an equation of the bi-directional optical flow is modified for unequal weights in a weighted prediction of the part of the image.

According to another general aspect of at least one embodiment, a method for decoding a part of an image is presented comprising sample-wise refinement using bi-directional optical flow wherein at least an equation of the bi-directional optical flow is modified for unequal weights in a weighted prediction of the part of the image.

According to another general aspect of at least one embodiment, an apparatus for video encoding is presented comprising means for implementing any one of the embodiments of the encoding method.

According to another general aspect of at least one embodiment, an apparatus for video decoding is presented comprising means for implementing any one of the embodiments of the decoding method.

According to another general aspect of at least one embodiment, an apparatus for video encoding is provided comprising one or more processors, and at least one memory. The one or more processors is configured to implement to any one of the embodiments of the encoding method.

According to another general aspect of at least one embodiment, an apparatus for video decoding is provided comprising one or more processors and at least one memory. The one or more processors is configured to implement to any one of the embodiments of the decoding method.

According to another general aspect of at least one embodiment, a weighted prediction is one of a Generalized Bi-prediction, a Bi-prediction with Coding units level Weights, a weighted prediction with image level weights, an image distance based weighted bi-prediction.

According to another general aspect of at least one embodiment, modifying the at least one bi-directional optical flow equation comprises bit depth shifting the unequal weights used in the weighted prediction.

According to another general aspect of at least one embodiment, modifying the at least one bi-directional optical flow equation comprises quantifying the unequal weighs used in the weighted prediction.

According to another general aspect of at least one embodiment, modifying the at least one bi-directional optical flow equation comprises deriving modified weighs to apply to predictions of the part of the image from the unequal weights used in weighted prediction.

According to another general aspect of at least one embodiment, a non-transitory computer readable medium is presented containing data content generated according to the method or the apparatus of any of the preceding descriptions.

According to another general aspect of at least one embodiment, a signal or a bitstream is provided comprising video data generated according to the method or the apparatus of any of the preceding descriptions.

One or more of the present embodiments also provide a computer readable storage medium having stored thereon instructions for performing bi-directional optical flow, encoding or decoding video data according to any of the methods described above. The present embodiments also provide a computer readable storage medium having stored thereon a bitstream generated according to the methods described above. The present embodiments also provide a method and apparatus for transmitting the bitstream generated according to the methods described above. The present embodiments also provide a computer program product including instructions for performing any of the methods described.

DETAILED DESCRIPTION

It is to be understood that the figures and descriptions have been simplified to illustrate elements that are relevant for a clear understanding of the present principles, while eliminating, for purposes of clarity, many other elements found in typical encoding and/or decoding devices. It will be understood that, although the terms first and second may be used herein to describe various elements, these elements should not be limited by these terms.

These terms are only used to distinguish one element from another.

The various embodiments are described with respect to the encoding/decoding of an image.

They may be applied to encode/decode a part of image, such as a slice or a tile, a tile group or a whole sequence of images.

Various methods are described above, and each of the methods comprises one or more steps or actions for achieving the described method. Unless a specific order of steps or actions is required for proper operation of the method, the order and/or use of specific steps and/or actions may be modified or combined.

At least some embodiments relate to introducing weighting in inter-prediction method and more particularly in BI-directional Optical flow (BIO).

In the following, some limitations regarding the Generalized Bi-prediction (GBI or BCW) and Bi-directional Optical flow (BIO or BDOF) are disclosed, a generic embodiment for modified BIO process is disclosed, several embodiments of a modified BIO process incorporating GBI weighting are disclosed, several embodiments of a unified weighting for both GBI and asymmetric bi-prediction are disclosed, and additional information and generic embodiments are disclosed.

Generalized Bi-Prediction (GBI)

Figure 1:
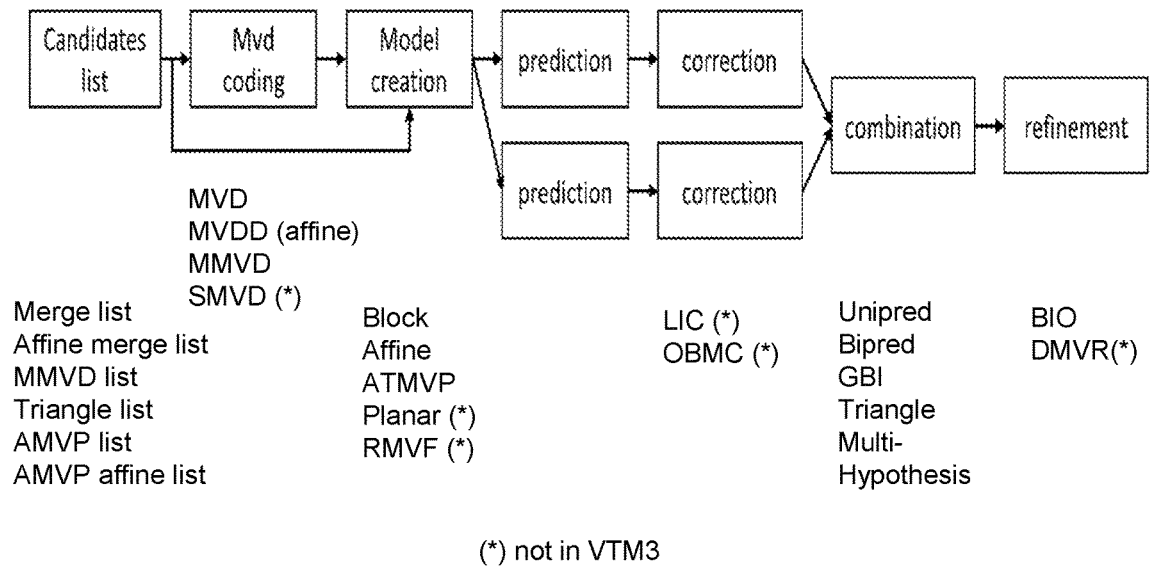
FIG. 1 illustrates of an exemplary flowchart of the inter prediction process in an encoder architecture.
Figure 2:
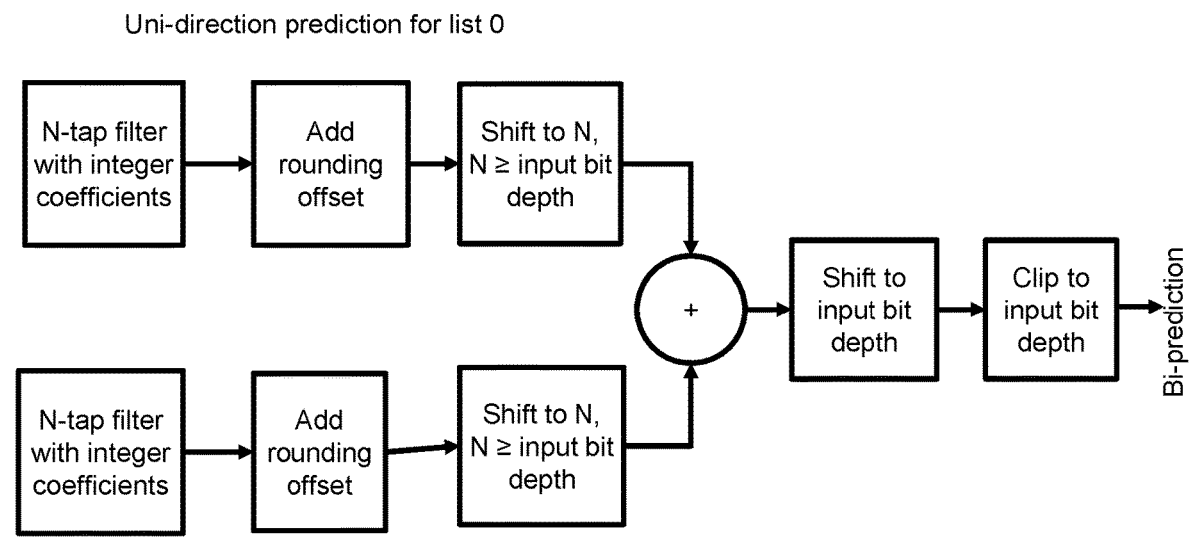
FIG. 2 illustrates an exemplary embodiment of bi-prediction process in HEVC.

In HEVC, the averaging of 2 uni-directional prediction signals for bi-prediction is done at a higher precision than either the input or internal bit depth. FIG. 2 illustrates an exemplary embodiment of bi-prediction process in HEVC. The bi-prediction formula is shown in Equation 1 below, where offset and shift are parameters used to normalize the final predictor to input bitdepth.

$$P_{bidir} = (P_{L0} + P_{L1} + \text{offset}) \gg \text{shift} \quad \text{Equation 1}$$

$P_{L0}$ and $P_{L1}$ are prediction samples built with motion compensation (MC) process of reference samples of list L0 and list L1 in bi-prediction mode. Additionally, to increase the sample-based calculation precision, the sample values are stored into an increased bit-depth precision. Typically, the prediction samples $P_{L0}$ and $P_{L1}$ are modified by an internal offset OFFSETINTERNAL and expressed using BITDEPTHINTERNAL. The offset is deduced as:

$$\text{OFFSETINTERNAL} = (1 \ll (\text{BITDEPTHINTERNAL} - 1))$$

Typically BITDEPTHINTERNAL=14.

It means for a final prediction $P'_{L0}$ expressed on bitdepth bits, we have the relationship:

$$P'_{L0} = (P_{L0} + \text{OFFSETINTERNAL}) \gg (\text{BITDEPTHINTERNAL} - \text{bitdepth})$$

It gives the final values:

$$\text{shift} = (\text{BITDEPTHINTERNAL} + 1 - \text{bitdepth})$$

And $$\text{offset} = (1 \ll (\text{shift} - 1)) + \text{OFFSETINTERNAL}$$

As there is no rounding in intermediate stages, HEVC interpolation filter allows certain implementation optimizations.

In VVC, multiple weights are used for averaging 2 uni-directional prediction (GBI) to get a bi-directional prediction. Typically, the weights used are {−¼, 5/4}, {3/8, 5/8} or {½, ½} (where {½, ½} are the weights used in HEVC), and the bi-prediction formula is modified as shown in Equation 2. Only one weight is used for the entire block.

$$P_{bidir} = ((1 - w_1) * P_{L0} + w_1 * P_{L1} + \text{offset}) \gg \text{shift} \quad \text{Equation 2}$$

The new values are then:

$$\text{shift} = \text{BITDEPTHINTERNAL} - \text{bitdepth} + \text{GbiBd}$$

And $$\text{offset} = (1 \ll (\text{shift} - 1)) + \text{OFFSETINTERNAL} \ll \text{GbiBd}$$

Where GbiBd is the bitdepth of the weight of GBI, typically GbiBd=3 as depicted in example in Table 1. Note that the sum of Gbi weights (w0+w1) is 1.

TABLE 1 example of GBI weights.

| GBI Weight value | GbiNum | Binarization of GBi Index |
|---|---|---|
| −¼ | −1 | 0000 |
| ⅜ | 3 | 001 |
| ½ | 1 | 1 |
| ⅝ | 5 | 01 |
| 5/4 | 5 | 0001 |

Bi-Directional Optical Flow

The latest development of VVC (test model VTM-3) includes the Bi-Directional Optical Flow (BDOF) tool. BDOF, previously referred to as BIO, is a simpler version that requires much less computation, especially in terms of number of multiplications and the size of the multiplier compared to previous versions of BIO.

BDOF is used to refine the bi-prediction signal of a CU at the 4×4 sub-block level. BDOF is applied to a CU if it satisfies the following conditions:

1) the CU's height is not 4, and the CU is not in size of 4×8,
2) the CU is not coded using affine mode or the ATMVP merge mode;
3) the CU is coded using "true" bi-prediction mode, i.e., one of the two reference pictures is prior to the current picture in display order and the other is after the current picture in display order.

BDOF is only applied to the luma component.

As its name indicates, the BDOF mode is based on the optical flow concept, which assumes that the motion of an object is smooth and its luminance is constant along the considered time interval. For each 4×4 sub-block, a motion refinement ($v_x$, $v_y$) is calculated by minimizing the difference between the L0 and L1 prediction samples. The motion refinement is then used to adjust the bi-predicted sample values in the 4×4 sub-block. The following steps are applied in the BDOF process.

First, the horizontal and vertical gradients, $$\frac{\partial I^{(k)}}{\partial x}(i, j) \text{ and } \frac{\partial I^{(k)}}{\partial y}(i, j), k = 0, 1,$$

of the two prediction signals are computed by directly calculating the difference between two neighboring samples, i.e., $$\frac{\partial I^{(k)}}{\partial x}(i, j) = (I^{(k)}(i+1, j) - I^{(k)}(i-1, j)) \gg 4 \quad \text{Equation 3-1}$$

$$\frac{\partial I^{(k)}}{\partial y}(i, j) = (I^{(k)}(i, j+1) - I^{(k)}(i, j-1)) \gg 4$$

where $I^{(k)}(i,j)$ are the sample value at coordinate (i,j) of the prediction signal in list k, k=0,1.

Then, the auto- and cross-correlation of the gradients, $S_1$, $S_2$, $S_3$, $S_5$ and $S_6$, are calculated as $$S_1 = \sum_{(i,j)\in\Omega} \psi_x(i, j) \cdot \psi_x(i, j), \quad \text{Equation 3-2}$$

$$S_3 = \sum_{(i,j)\in\Omega} \theta(i, j) \cdot \psi_x(i, j)$$

$$S_2 = \sum_{(i,j)\in\Omega} \psi_x(i, j) \cdot \psi_y(i, j)$$

$$S_5 = \sum_{(i,j)\in\Omega} \psi_y(i, j) \cdot \psi_y(i, j) \quad S_6 = \sum_{(i,j)\in\Omega} \theta(i, j) \cdot \psi_y(i, j)$$

Where:

$$\psi_x(i, j) = \left(\frac{\partial I^{(1)}}{\partial x}(i, j) + \frac{\partial I^{(0)}}{\partial x}(i, j)\right) \gg n_a \quad \text{Equation 3-3}$$

$$\psi_y(i, j) = \left(\frac{\partial I^{(1)}}{\partial y}(i, j) + \frac{\partial I^{(0)}}{\partial y}(i, j)\right) \gg n_a$$

$$\theta(i, j) = (I^{(1)}(i, j) \gg n_b) - (I^{(0)}(i, j) \gg n_b)$$

where $\Omega$ is a 6×6 window surrounding the 4×4 sub-block.

The motion refinement ($v_x$, $v_y$) is then derived using the cross- and auto-correlation terms using the following:

$$v_x = S_1 > 0 \ ? \ clip3(-th'_{BIO}, th'_{BIO}, - \quad \text{Equation 3-4}$$
$$((S_3 \cdot 2^{n_b-n_a}) \gg \lfloor log_2 S_1 \rfloor)) : 0$$

$$v_y = S_5 > 0 \ ? \ clip3(-th'_{BIO}, th'_{BIO}, -$$
$$((S_6 \cdot 2^{n_b-n_a} - ((v_x S_{2,m}) \ll n_{S_2} + v_x S_{2,s})/2) \gg$$
$$\lfloor log_2 S_5 \rfloor)) : 0$$

where $$S_{2,m} = S_2 \gg n_{S_2}, S_{2,s} = S_2 \ \& (2^{n_{S_2}} - 1), th'_{BIO} = 2^{13-BD}.$$

and $\lfloor \cdot \rfloor$ is the floor function.

Based on the motion refinement and the gradients, the following adjustment is calculated for each sample in the 4×4 sub-block:

$$b(x, y) = rnd\left(\left(v_x\left(\frac{\partial I^{(1)}(x, y)}{\partial x} - \frac{\partial I^{(0)}(x, y)}{\partial x}\right)\right)/2\right) + \quad \text{Equation 3-5}$$
$$rnd\left(\left(v_y\left(\frac{\partial I^{(1)}(x, y)}{\partial y} - \frac{\partial I^{(0)}(x, y)}{\partial y}\right)\right)/2\right)$$

Finally, the BDOF samples of the CU are calculated by adjusting the bi-prediction samples as follows:

$$pred_{BDOF}(x,y) = (I^{(0)}(x,y) + I^{(1)}(x,y) + b(x,y) + o_{offset}) \gg shift \quad \text{Equation 3-6}$$

In the above, the values of $n_a$, $n_b$ and $n_{S_2}$ are equal to 3, 6, and 12, respectively. These values are selected such that the multipliers in the BDOF process do not exceed 15-bit, and the maximum bit-width of the intermediate parameters in the BDOF process is kept within 32-bit.

Figure 3:
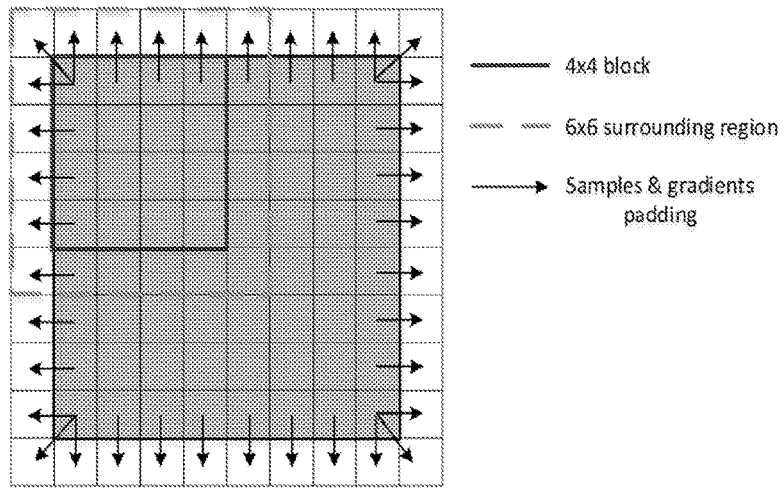
FIG. 3 illustrates an exemplary Extended CU region used in BDOF according to a particular embodiment.

In order to derive the gradient values, some prediction samples $I^{(k)}(i,j)$ in list k (k=0,1) outside of the current CU boundaries need to be generated. As depicted in FIG. 3, the BDOF in VTM-3.0 uses one extended row/column around the CU's boundaries. In order to control the computational complexity of generating the out-of-boundary prediction samples, bilinear filter is used to generate prediction samples in the extended area (white positions), and the normal 8-tap motion compensation interpolation filter is used to generate prediction samples within the CU (gray positions). These extended sample values are used in gradient calculation only. For the remaining steps in the BDOF process, if any sample and gradient values outside of the CU boundaries are needed, they are padded (i.e. repeated) from their nearest neighbors. FIG. 3 illustrates an exemplary Extended CU region used in BDOF.

Bi-directional Optical flow (BIO) comprises sample-wise motion refinement which is performed on top of block-wise motion compensation for bi-prediction. The sample-level motion refinement does not use signaling. In case of bi-prediction, the goal of BIO is to refine motion for each sample assuming linear displacement in-between the two reference pictures and based on Hermite's interpolation of the optical flow.

Some Limitations of BDOF and GBI

Figure 4:
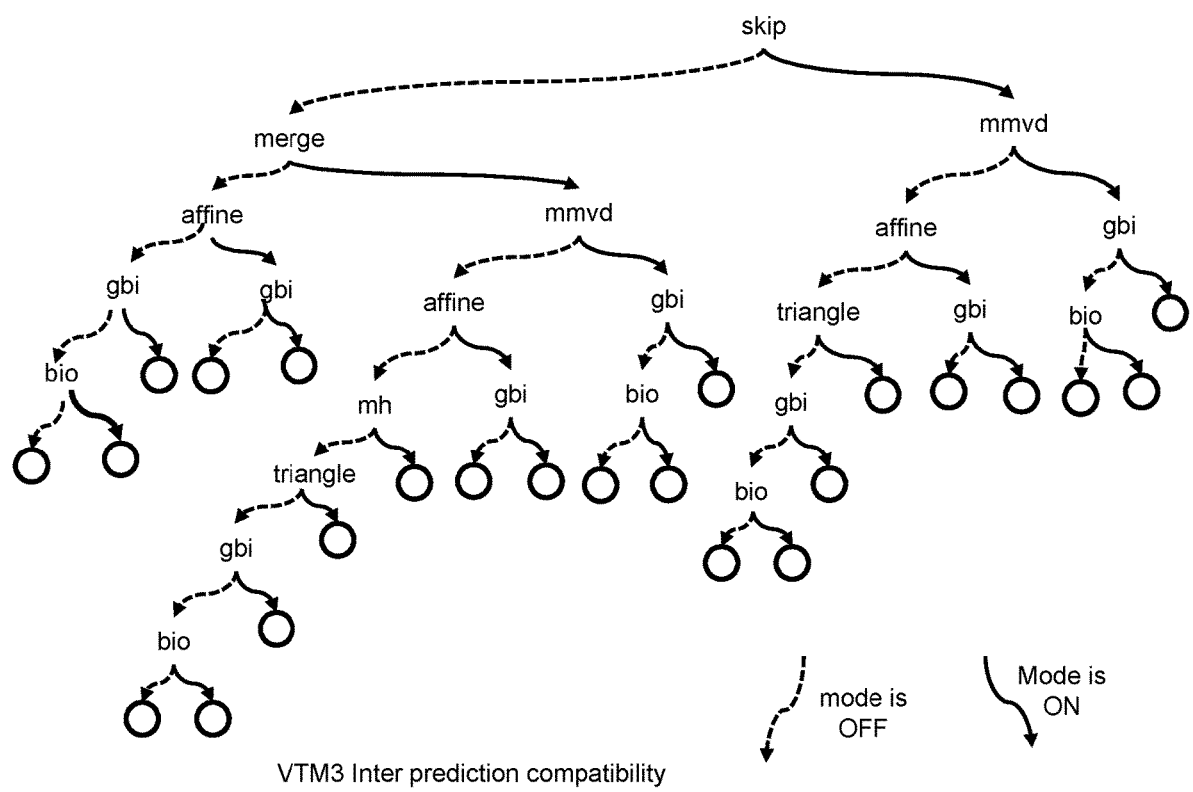
FIG. 4 illustrates an exemplary flowchart of the determination of the prediction modes compatibility tree according to a particular embodiment.

In latest development of VVC (test model VTM-3), the three modes, GBI, BDOF and asymmetric bi-prediction, are currently exclusive and not always available in all possible coding modes. FIG. 4 illustrates an exemplary flowchart of the determination of the prediction modes compatibility tree according to the latest development of VVC. In FIG. 4, the dash line illustrates when the mode is off, the solid line illustrated when the mode is activated.

Advantageously, the prediction modes compatibility tree makes the coding less complex (reduces the modes choice combinatory to explore and alleviates the decoding pipeline). In the latest version of VVC, BDOF and GBI are mutually exclusive, and BDOF is activated only for symmetric bi-prediction (i.e. when the reference pictures are in the past and future of the current frame).

Figure 5:
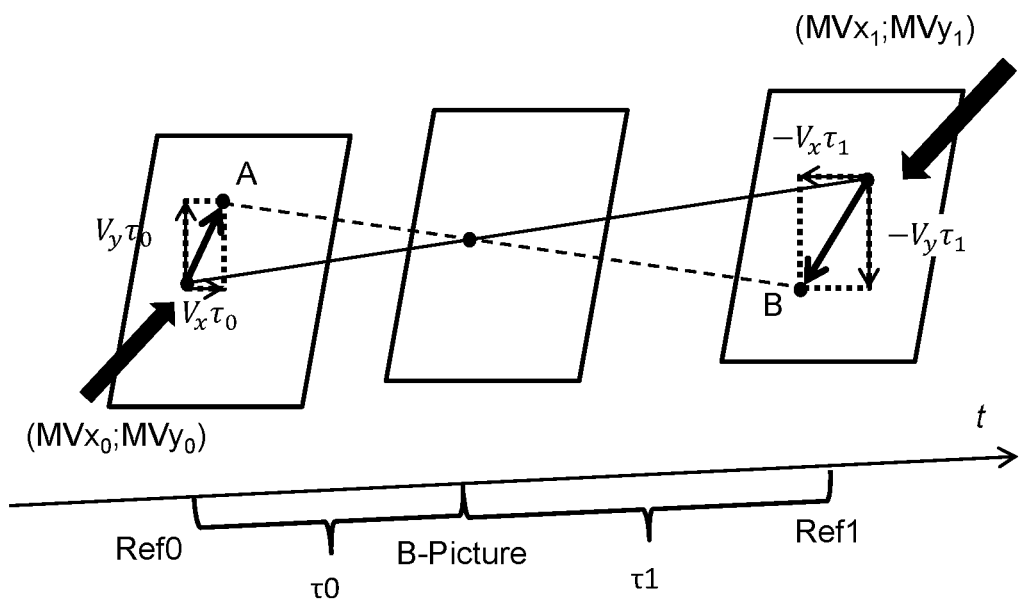
FIG. 5 illustrates of an example of an Optical Flow trajectory according to a particular embodiment.

In previous prior art approach (former test model versions of VVC), the test model software included a weighting of the gradient images depending on the POC of the reference picture and current picture to deal with the case the current POC is not centered in-between POC0 and POC1 (asymmetric bi-prediction as depicted in FIG. 5). However, the weighting was not completely done in the BDOF process: only the spatial gradients were weighted by the temporal distance (Equation 3-1).

In previous prior art approach, a method compliant with adapted weighting is disclosed for asymmetric bi-prediction, especially used in LDB (low delay bi-prediction profile). An adaptation of the BDOF process implementing the weight of asymmetric bi-prediction, is therefore desirable. Besides, the test model software of the previous prior art approach included a possible GBI and BDOF uniformization by simply taking into account the GBI weights in the final BDOF Equation 3-6. A refinement of GBI and BDOF uniformization method is also desirable.

At Least One Embodiment of a Method for Adapting BDOF Process to Weighted Prediction In order to cope with the limitations presented above, at least one embodiment is disclosed that:
incorporates GBI weighting in the BDOF process, taking into account the bitdepth constraints.
unifies the weighting for both GBI and asymmetric bi-prediction constraints Accordingly, the at least one embodiment of method for adapting BDOF to GBI weighting
Improves BIO+GBI weighting performances thanks to the disclosed offset/shift
Includes predictions weighting in the BIO process without losing accuracy for non-weighted prediction
Includes predictions weighting in the BIO process instead of the predictions sample weighting to keep the maximum accuracy
Allows approximating (through quantization described in the following embodiment) weighting during the BIO process to keep the storage bitdepth low.

Figure 9:
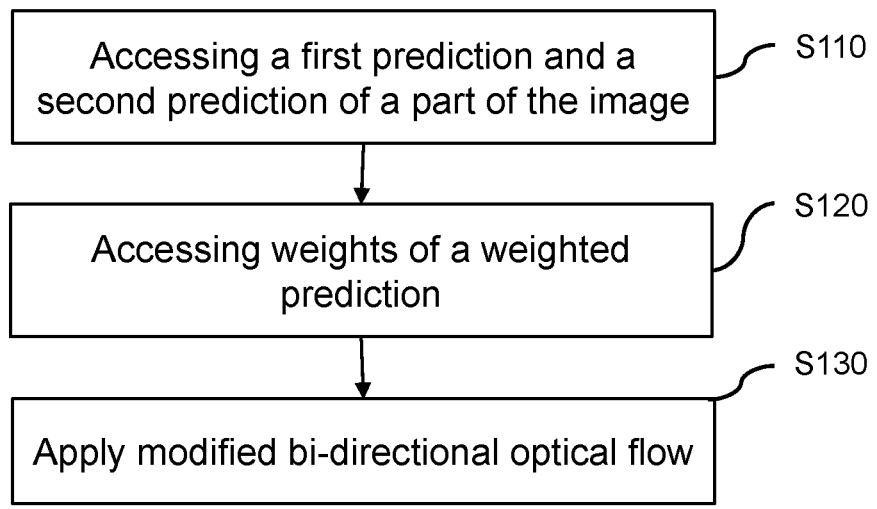
FIG. 9 illustrates of an exemplary flowchart of a bi-directional optical flow process in inter prediction for weighted prediction according to a particular embodiment.

FIG. 9 illustrates of an exemplary flowchart of a bi-directional optical flow process in inter prediction for weighted prediction according to a particular embodiment. Advantageously, the bi-directional optical flow process is applied any inter-prediction of an encoding method, a decoding method, an encoder or a decoder. As previously, explained, bi-directional optical flow process comprises sample-wise refinement of the inter-prediction wherein a correcting term b is used to adjust a bi-predicted sample value. According to the present principles, the bi-directional optical flow is adapted to weighted prediction and at least an equation of the bi-directional optical flow is modified for unequal weights in a weighted prediction of the part of the image. According to non-limiting examples, weighted prediction is one of a Generalized Bi-prediction, a Bi-prediction with Coding units level Weights, a weighted prediction with image level weights, an image distance based weighted bi-prediction. As latter on detailed, according to different characteristics, modifying the bi-directional optical flow equation comprises bit depth shifting weights used in the weighted prediction, quantifying weighs used in the weighted prediction or deriving modified weighs to apply to predictions of the part of the image from weights used in weighted prediction.

As illustrated on FIG. 9 and explained with BDOF equations 4-x and 5-x, the bi-directional optical flow comprises of a preliminary step S110 of accessing a first prediction $I^{(0)}$, and a second prediction $I^{(1)}$ of a part of the image, another preliminary step S120 of accessing weights of the weighted prediction and applying modified bi-directional optical flow using as input the first prediction $I^{(0)}$, the second prediction $I^{(1)}$ and the weights $\omega_0$ and $\omega_1$ to obtain a refined prediction $pred_{BDOF}(x,y)$.

At Least One First Embodiment of a Method for Adapting BDOF Process to GBi Weighting According to a particular variant of the first embodiment, the weighting for GBI is simplified. In this variant of the first embodiment, we consider the weighting on the images coming from an arbitrary weighting of the images, typically the GBI weights apply on images.

According to a particular variant of the first embodiment, instead of applying the weights on the input prediction for the whole BIO process, only the final equation 3-6 is modified.

$$pred_{BDOF}(x,y)=(2(\omega_0 I^{(0)}(x,y)+\omega_1 I^{(1)}(x,y))/(\omega_0+w1)+b(x,y)+o_{offset}) \gg shift$$

Where $\omega_0$ and $\omega_1$ are the GBI weights, typically, with a 3 bits weights.

Advantageously, in order to increase the accuracy, the equation is rewritten where $\omega_0$ and $\omega_1$ are GBI numerators (see Table 1):

$$pred_{BDOF}(x,y)=((\omega_0 I^{(0)}(x,y)+\omega_1 I^{(1)}(x,y))+(b(x,y) \ll shift2)+o_{offset}) \gg shift$$

Where the new values are:

shift=BITDEPTHINTERNAL−bitdepth+GbiBd shift2=GbiBd $o_{offset}=((1 \ll (shift-1))+OFFSETINTERNAL \ll GbiBd)+(1 \ll (shift2-1))$ Note that the new offset now integrates a correction factor for the rounding to take into account the BIO correction term final shifting.

Advantageously, in order to avoid the shift by shift2 in the modified equation 3-6

$$pred_{BDOF}(x,y)=((\omega_0 I^{(0)}(x,y)+\omega_1 I^{(1)}(x,y))+(b(x,y) \ll shift2)+o_{offset}) \gg shift$$

The process can be further simplified by changing the computation of the b correction factor. Indeed, the b factor is shifted by shift2 (typically shift2=3).

From equation 3-5:

$$b(x, y) = rnd\left(\left(v_x\left(\frac{\partial I^{(1)}(x, y)}{\partial x} - \frac{\partial I^{(0)}(x, y)}{\partial x}\right)\right)/2\right) + rnd\left(\left(v_y\left(\frac{\partial I^{(1)}(x, y)}{\partial y} - \frac{\partial I^{(0)}(x, y)}{\partial y}\right)\right)/2\right) \quad \text{Equation 3-1}$$

the division by 2 and rounding is removed, giving:

$$b(x, y) = v_x\left(\frac{\partial I^{(1)}(x, y)}{\partial x} - \frac{\partial I^{(0)}(x, y)}{\partial x}\right) + v_y\left(\frac{\partial I^{(1)}(x, y)}{\partial y} - \frac{\partial I^{(0)}(x, y)}{\partial y}\right)$$

Then the $v_x$ and $v_y$ factors can be further shifted by (shift2-1) (as the removing of the division in 3-5 already removed 1 bit). Then the shift operation in 3-4 are further adapted:

$$v_x = S_1 > 0 ? clip3(-th'_{BIO}, th'_{BIO}, -((S_3 \cdot 2^{nb-na}) \gg L0)):0$$

$$v_y = S_5 > 0 ? clip3(-th'_{BIO}, th'_{BIO}, -((S_6 \cdot 2^{nb-na} - ((v_x S_{2,m}) \ll n_{S_2} + v_x S_{2,s})/2) \gg L1)):0$$

With $$L0=\lfloor \log_2 S_1 \rfloor - (shift-1)$$

$$L1=\lfloor \log_2 S_5 \rfloor - (shift-1)$$

And $th'_{BIO}$ can be adapted accordingly compared to the original threshold.

This embodiment advantageously avoids a division (or shift) in equation 3-5, and increases the accuracy of the factors $v_x$ and $v_y$. Overall, the complexity is decreased compared to a full GBI and BIO combination and performance are improved compared to a naïve GBI and BIO combination of the last step of BIO only.

At Least One Second Embodiment of Method for Adapting BIO Process to Asymmetric Bi-Prediction In this at least one second embodiment, we consider the weighting on the images is coming typically from (asymmetric) temporal distance between images.

In original BIO equations, taking into account a weight on each prediction images leads to the following changes in equations (3-x), other equations remaining the same as disclosed in "Bi-directional optical flow for future codec" by A. Alshin, E. Alshina in DCC 2016.

Spatial Gradients:

$$\frac{\partial I^{(k)}}{\partial x}(i, j) = \omega_k(I^{(k)}(i+1, j) - I^{(k)}(i-1, j)) \gg 4 \quad \text{Equation 4-1}$$

$$\frac{\partial I^{(k)}}{\partial y}(i, j) = \omega_k(I^{(k)}(i, j+1) - I^{(k)}(i, j-1)) \gg 4$$

BIO Correction:

$$b(x, y) = \quad \text{Equation 4-5}$$

$$rnd\left(\omega_0 * \omega_1\left(v_x\left(\omega_0/\omega_1 \frac{\partial I^{(1)}(x, y)}{\partial x} - \omega_1/\omega_0 \frac{\partial I^{(0)}(x, y)}{\partial x}\right)\right)/(\omega_0+\omega_1)^2\right) + rnd\left(\omega_0 * \omega_1\left(v_y\left(\omega_0/\omega_1 \frac{\partial I^{(1)}(x, y)}{\partial y} - \omega_1/\omega_0 \frac{\partial I^{(0)}(x, y)}{\partial y}\right)\right)/(\omega_0+\omega_1)^2\right)$$

Final weighting according to the Hermite interpolation:

$$pred_{BDOF}(x,y)=((\omega_1^2(3\omega_0+\omega_1)I^{(0)}(x,y)+\omega_0^2(3\omega_1+\omega_0)I^{(1)}(x,y))/(\omega_0+\omega_1)^3+b(x,y)+o_{offset}) \gg shift \quad \text{Equation 4-6}$$

In a variant of the at least one second embodiment, a constant bit depth is kept for BIO weighting. Keeping the same bitdepth for internal storage (corresponding to the gradients in equation 4-1), the BIO process is adapted. We show the process for one non-limiting example, with a weighting on 1 bit (weight can take two values: 1 or 2).

In this example, we assume that the weights can take the value 1 or 2 only (optionally with a sign). We define $M=(1 \ll n)=2$.

Spatial Gradients:

Equations are changed as follow:

$$\frac{\partial I^{(k)}}{\partial x}(i, j) = (I^{(k)}(i+1, j) - I^{(k)}(i-1, j)) \gg (4+m_k)$$

$$\frac{\partial I^{(k)}}{\partial y}(i, j) = (I^{(k)}(i, j+1) - I^{(k)}(i, j-1)) \gg (4+m_k)$$

The value of m is computed as follow:

$$p = \min(|\omega_0|, |\omega_1|)$$

$$\omega'_0 = clip\left(\frac{\omega_0}{p}, -M, M\right)$$

$$\omega'_1 = clip\left(\frac{\omega_1}{p}, -M, M\right)$$

Where the clip function clip(x,a,b) will clip the value x to be between a and b, and a/b represents the integer division.

$$m_0 = m_1 = m = 0, \text{ if } |\omega'_0| == 1 \,\&\&\, |\omega'_1| == 1 \quad (a)$$

$$m_c = 0 \text{ with } c = \underset{c \in \{0,1\}}{\arg\max}|\omega'_c|, \quad (b)$$

$$m_d = 1 \text{ with } d = \underset{d \in \{0,1\}}{\arg\min}|\omega'_d|, m = m_d, \text{ otherwise}$$

In the first case (a), the BIO process is unchanged compare to the regular process.

In the second case, the spatial gradients are weighted such as the spatial gradient with the smallest weight will be half the original spatial gradient, and the spatial gradient with the largest weight will be unchanged.

Example for n=1, (M=2), $\omega_0$=2 $\omega_1$=6:

$\omega'_0$=1

$\omega'_1$=2

$m_0$=1,$m_1$=0,$m$=1

Variant for Weights Computation

The scale factor between the largest and smallest weights can be quantized. For example, with $\omega_c$ the largest weight, and a quantization of 2 of the scale factor, we obtain:

$$\omega'_c = \text{clip}\left(\frac{\frac{\omega_c}{p}}{2}, -M, M\right)$$

For example, for n=1, (M=2), $\omega_0$=2 $\omega_1$=4:, without scale factor quantization, the results are:

$\omega'_0$=1

$\omega'_1$=2

$m$=1,$m_1$=0,$m$=1

With a scale factor of 2, the results are:

$\omega'_0$=1

$\omega'_1$=1

$m_0$=0,$m_1$=0,$m$=0

Bio Correction

The bio correction term is modified as follow:

$$b(x, y) = \quad \text{Equation 5-5}$$

$$rnd\left(\omega'_0 * \omega'_1\left(v_x\left(\omega'_0/\omega'_1\frac{\partial I^{(1)}(x, y)}{\partial x} - \omega_1/\omega_0\frac{\partial I^{(0)}(x, y)}{\partial x}\right)\right)/\right.$$

$$(\omega'_0 + \omega'_1)^2\right) + rnd\left(\omega'_0 *\right.$$

$$\omega'_1\left(v_y\left(\omega'_0/\omega'_1\frac{\partial I^{(1)}(x, y)}{\partial y} - \omega'_1/\omega'_0\frac{\partial I^{(0)}(x, y)}{\partial y}\right)\right)/$$

$$(\omega'_0 + \omega'_1)^2\right)$$

-continued $$b(x, y) = rnd\left(\left(v_x\left(\omega_0^{2'}\frac{\partial I^{(1)}(x, y)}{\partial x} - \omega_1^{2'}\frac{\partial I^{(0)}(x, y)}{\partial x}\right)\right)/\right.$$

$$(\omega'_0 + \omega'_1)^2\right) +$$

$$rnd\left(\left(v_y\left(\omega_0^{2'}\frac{\partial I^{(1)}(x, y)}{\partial y} - \omega_1^{2'}\frac{\partial I^{(0)}(x, y)}{\partial y}\right)\right)/(\omega'_0 + \omega'_1)^2\right)$$

As the weights are coded on n=1 bit, $\omega_k^{2'}$ is at most 4 and can be done using a shift operation.

The term $(\omega_0' + \omega_1')^2$ can be either:

4 when the weights are equal (to 1), then the division is done using a bit shift.

Or 9 (when a weight equal 1 and the other 2). In this case, the division is approximated by a division by 8 (using a bit shift) and the largest weight squared approximate by 3 (instead of 4).

Example: $\omega'_0$=1 $\omega'_1$=2

$$b(x, y) = rnd\left(\left(v_x\left(\frac{\partial I^{(1)}(x, y)}{\partial x} - 3\frac{\partial I^{(0)}(x, y)}{\partial x}\right)\right)/8\right) +$$

$$rnd\left(\left(v_y\left(\frac{\partial I^{(1)}(x, y)}{\partial y} - 3\frac{\partial I^{(0)}(x, y)}{\partial y}\right)\right)/8\right)$$

Final Weighting:

$$\text{pred}_{BDOF}(x,y) = ((\omega_1^2(3\omega_0 + \omega_1)I^{(0)}(x,y) + \omega_0^2$$
$$(3\omega_1 + \omega_0)I^{(1)}(x,y))/(\omega_0 + \omega_1)^3 + b(x,y) + o_{\text{offset}})\text{>>shift}$$

In the final weighting, the weights are changed to use bit shifting operation instead of division. In case of equal weights, the process is unchanged. We described the process for one case (the other being symmetric).

Example: $\omega'_0$=1 $\omega'_1$=2

$$\text{pred}_{BDOF}(x,y) = ((24I^{(0)}(x,y) + 8I^{(1)}(x,y))/32 +$$
$$b(x,y) + o_{\text{offset}})\text{>>shift}$$

Additional Embodiments and Information

This application describes a variety of aspects, including tools, features, embodiments, models, approaches, etc. Many of these aspects are described with specificity and, at least to show the individual characteristics, are often described in a manner that may sound limiting. However, this is for purposes of clarity in description, and does not limit the application or scope of those aspects. Indeed, all of the different aspects can be combined and interchanged to provide further aspects. Moreover, the aspects can be combined and interchanged with aspects described in earlier filings as well.

Figure 6:
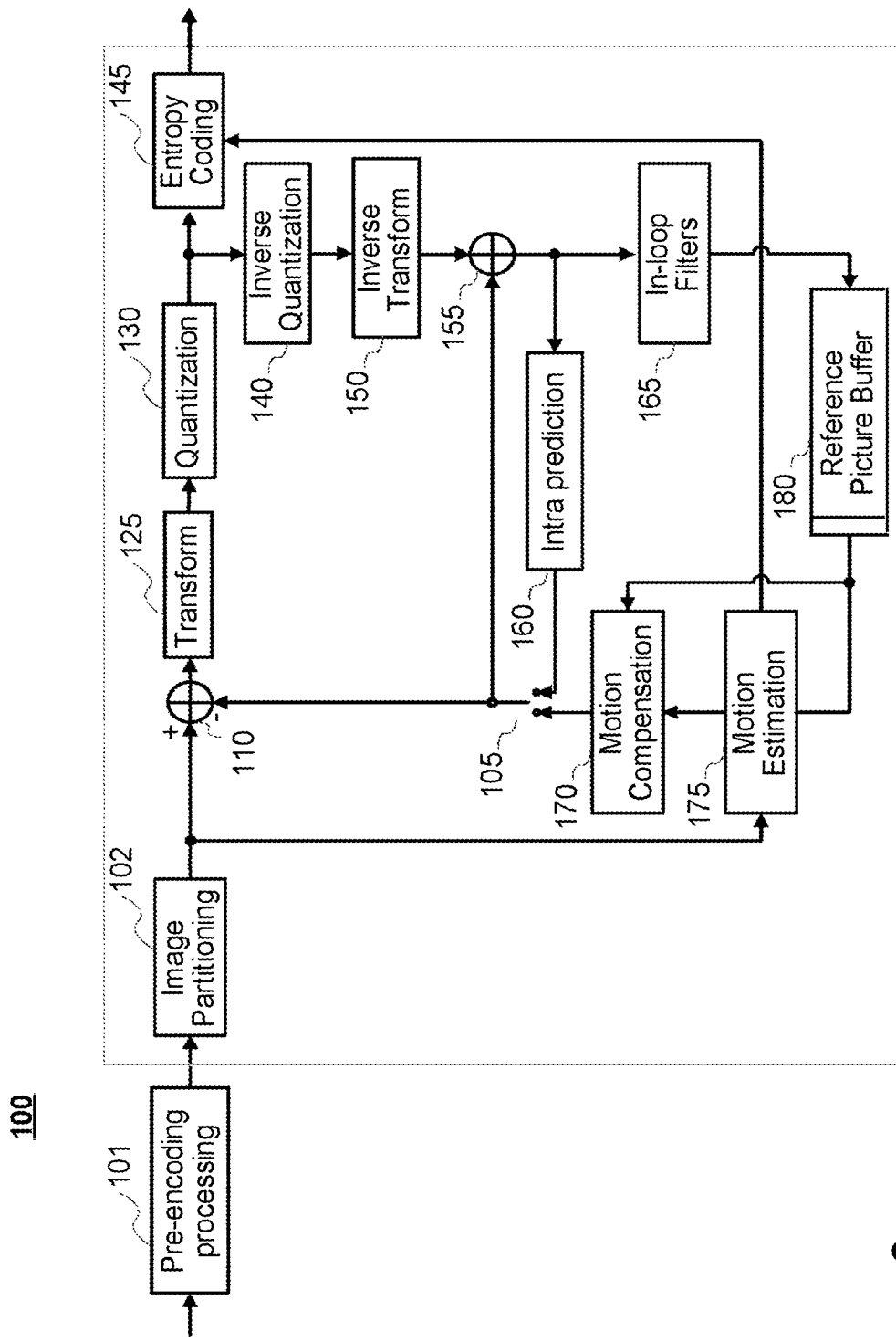
FIG. 6 illustrates a block diagram of an embodiment of video encoder in which various aspects of the embodiments may be implemented.
Figure 7:
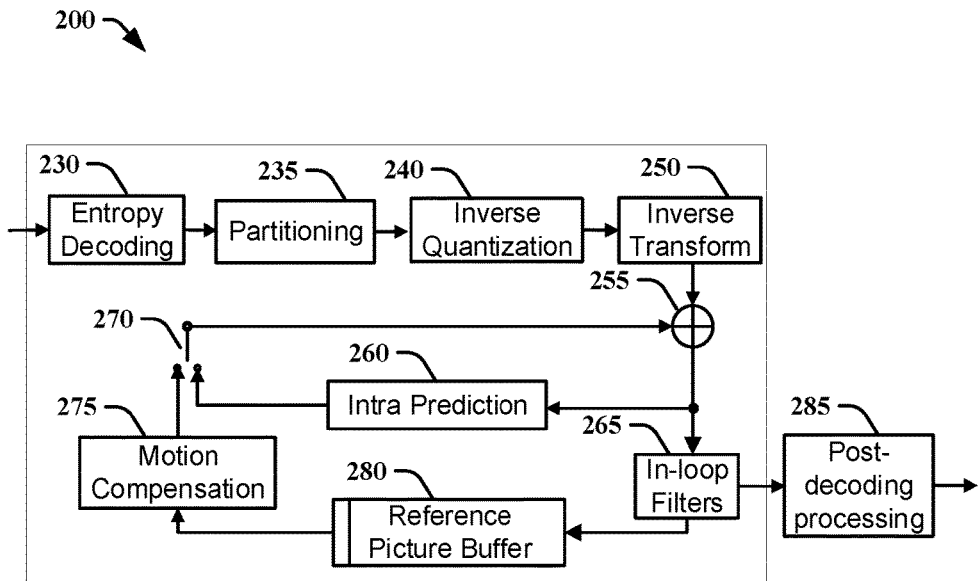
FIG. 7 illustrates a block diagram of an embodiment of video decoder in which various aspects of the embodiments may be implemented.
Figure 8:
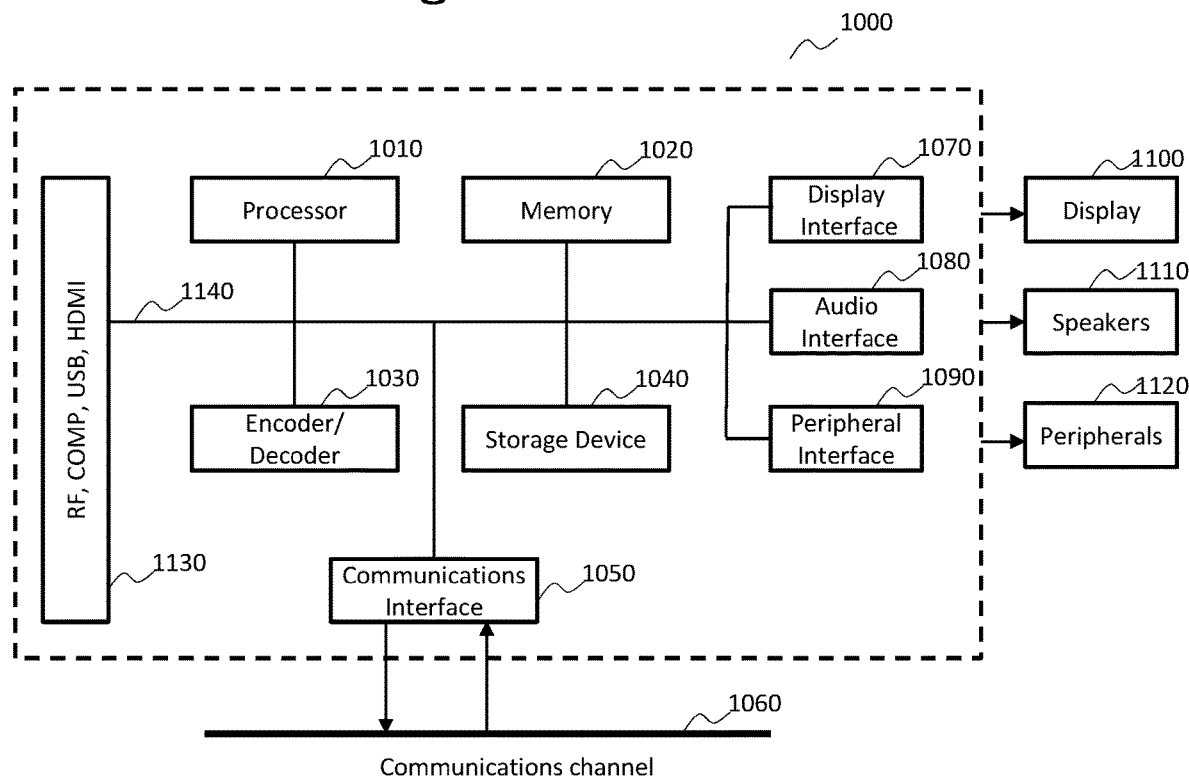
FIG. 8 illustrates a block diagram of an example apparatus in which various aspects of the embodiments may be implemented.

The aspects described and contemplated in this application can be implemented in many different forms. FIGS. 6, 7 and 8 below provide some embodiments, but other embodiments are contemplated and the discussion of FIGS. 6, 7 and 8 does not limit the breadth of the implementations. At least one of the aspects generally relates to video encoding and decoding, and at least one other aspect generally relates to transmitting a bitstream generated or encoded. These and other aspects can be implemented as a method, an apparatus, a computer readable storage medium having stored thereon instructions for encoding or decoding video data according to any of the methods described, and/or a computer readable storage medium having stored thereon a bitstream generated according to any of the methods described.

In the present application, the terms "reconstructed" and "decoded" may be used interchangeably, the terms "pixel" and "sample" may be used interchangeably, the terms "image," "picture" and "frame" may be used interchangeably. Usually, but not necessarily, the term "reconstructed" is used at the encoder side while "decoded" is used at the decoder side.

Various methods are described herein, and each of the methods comprises one or more steps or actions for achieving the described method. Unless a specific order of steps or actions is required for proper operation of the method, the order and/or use of specific steps and/or actions may be modified or combined.

Various methods and other aspects described in this application can be used to modify modules, for example, the motion compensation (170) and motion estimation modules (175, 275), of a video encoder 100 and decoder 200 as shown in FIG. 6 and FIG. 7. Moreover, the present aspects are not limited to VVC or HEVC, and can be applied, for example, to other standards and recommendations, whether pre-existing or future-developed, and extensions of any such standards and recommendations (including VVC and HEVC). Unless indicated otherwise, or technically precluded, the aspects described in this application can be used individually or in combination.

Various numeric values are used in the present application. The specific values are for example purposes and the aspects described are not limited to these specific values.

FIG. 6 illustrates an encoder 100. Variations of this encoder 100 are contemplated, but the encoder 100 is described below for purposes of clarity without describing all expected variations.

Before being encoded, the video sequence may go through pre-encoding processing (101), for example, applying a color transform to the input color picture (e.g., conversion from RGB 4:4:4 to YCbCr 4:2:0), or performing a remapping of the input picture components in order to get a signal distribution more resilient to compression (for instance using a histogram equalization of one of the color components). Metadata can be associated with the pre-processing, and attached to the bitstream.

In the encoder 100, a picture is encoded by the encoder elements as described below. The picture to be encoded is partitioned (102) and processed in units of, for example, CUs. Each unit is encoded using, for example, either an intra or inter mode. When a unit is encoded in an intra mode, it performs intra prediction (160). In an inter mode, motion estimation (175) and compensation (170) are performed. The encoder decides (105) which one of the intra mode or inter mode to use for encoding the unit, and indicates the intra/inter decision by, for example, a prediction mode flag. Prediction residuals are calculated, for example, by subtracting (110) the predicted block from the original image block.

The prediction residuals are then transformed (125) and quantized (130). The quantized transform coefficients, as well as motion vectors and other syntax elements, are entropy coded (145) to output a bitstream. The encoder can skip the transform and apply quantization directly to the non-transformed residual signal. The encoder can bypass both transform and quantization, i.e., the residual is coded directly without the application of the transform or quantization processes.

The encoder decodes an encoded block to provide a reference for further predictions. The quantized transform coefficients are de-quantized (140) and inverse transformed (150) to decode prediction residuals. Combining (155) the decoded prediction residuals and the predicted block, an image block is reconstructed. In-loop filters (165) are applied to the reconstructed picture to perform, for example, deblocking/SAO (Sample Adaptive Offset) filtering to reduce encoding artifacts. The filtered image is stored at a reference picture buffer (180).

FIG. 7 illustrates a block diagram of a video decoder 200. In the decoder 200, a bitstream is decoded by the decoder elements as described below. Video decoder 200 generally performs a decoding pass reciprocal to the encoding pass as described in FIG. 6. The encoder 100 also generally performs video decoding as part of encoding video data.

In particular, the input of the decoder includes a video bitstream, which can be generated by video encoder 100. The bitstream is first entropy decoded (230) to obtain transform coefficients, motion vectors, and other coded information. The picture partition information indicates how the picture is partitioned. The decoder may therefore divide (235) the picture according to the decoded picture partitioning information. The transform coefficients are de-quantized (240) and inverse transformed (250) to decode the prediction residuals. Combining (255) the decoded prediction residuals and the predicted block, an image block is reconstructed. The predicted block can be obtained (270) from intra prediction (260) or motion-compensated prediction (i.e., inter prediction) (275). In-loop filters (265) are applied to the reconstructed image. The filtered image is stored at a reference picture buffer (280).

The decoded picture can further go through post-decoding processing (285), for example, an inverse color transform (e.g. conversion from YCbCr 4:2:0 to RGB 4:4:4) or an inverse remapping performing the inverse of the remapping process performed in the pre-encoding processing (101). The post-decoding processing can use metadata derived in the pre-encoding processing and signaled in the bitstream.

FIG. 7 illustrates a block diagram of an example of a system in which various aspects and embodiments are implemented. System 1000 can be embodied as a device including the various components described below and is configured to perform one or more of the aspects described in this document. Examples of such devices, include, but are not limited to, various electronic devices such as personal computers, laptop computers, smartphones, tablet computers, digital multimedia set top boxes, digital television receivers, personal video recording systems, connected home appliances, and servers. Elements of system 1000, singly or in combination, can be embodied in a single integrated circuit (IC), multiple ICs, and/or discrete components. For example, in at least one embodiment, the processing and encoder/decoder elements of system 1000 are distributed across multiple ICs and/or discrete components. In various embodiments, the system 1000 is communicatively coupled to one or more other systems, or other electronic devices, via, for example, a communications bus or through dedicated input and/or output ports. In various embodiments, the system 1000 is configured to implement one or more of the aspects described in this document.

The system 1000 includes at least one processor 1010 configured to execute instructions loaded therein for implementing, for example, the various aspects described in this document. Processor 1010 can include embedded memory, input output interface, and various other circuitries as known in the art. The system 1000 includes at least one memory 1020 (e.g., a volatile memory device, and/or a non-volatile memory device). System 1000 includes a storage device

1040, which can include non-volatile memory and/or volatile memory, including, but not limited to, Electrically Erasable Programmable Read-Only Memory (EEPROM), Read-Only Memory (ROM), Programmable Read-Only Memory (PROM), Random Access Memory (RAM), Dynamic Random Access Memory (DRAM), Static Random Access Memory (SRAM), flash, magnetic disk drive, and/or optical disk drive. The storage device 1040 can include an internal storage device, an attached storage device (including detachable and non-detachable storage devices), and/or a network accessible storage device, as non-limiting examples.

System 1000 includes an encoder/decoder module 1030 configured, for example, to process data to provide an encoded video or decoded video, and the encoder/decoder module 1030 can include its own processor and memory. The encoder/decoder module 1030 represents module(s) that can be included in a device to perform the encoding and/or decoding functions. As is known, a device can include one or both of the encoding and decoding modules. Additionally, encoder/decoder module 1030 can be implemented as a separate element of system 1000 or can be incorporated within processor 1010 as a combination of hardware and software as known to those skilled in the art.

Program code to be loaded onto processor 1010 or encoder/decoder 1030 to perform the various aspects described in this document can be stored in storage device 1040 and subsequently loaded onto memory 1020 for execution by processor 1010. In accordance with various embodiments, one or more of processor 1010, memory 1020, storage device 1040, and encoder/decoder module 1030 can store one or more of various items during the performance of the processes described in this document. Such stored items can include, but are not limited to, the input video, the decoded video or portions of the decoded video, the bitstream, matrices, variables, and intermediate or final results from the processing of equations, formulas, operations, and operational logic.

In some embodiments, memory inside of the processor 1010 and/or the encoder/decoder module 1030 is used to store instructions and to provide working memory for processing that is needed during encoding or decoding. In other embodiments, however, a memory external to the processing device (for example, the processing device can be either the processor 1010 or the encoder/decoder module 1030) is used for one or more of these functions. The external memory can be the memory 1020 and/or the storage device 1040, for example, a dynamic volatile memory and/or a non-volatile flash memory. In several embodiments, an external non-volatile flash memory is used to store the operating system of, for example, a television. In at least one embodiment, a fast external dynamic volatile memory such as a RAM is used as working memory for video coding and decoding operations, such as for MPEG-2 (MPEG refers to the Moving Picture Experts Group, MPEG-2 is also referred to as ISO/IEC 13818, and 13818-1 is also known as H.222, and 13818-2 is also known as H.262), HEVC (HEVC refers to High Efficiency Video Coding, also known as H.265 and MPEG-H Part 2), or VVC (Versatile Video Coding, a new standard being developed by JVET, the Joint Video Experts Team).

The input to the elements of system 1000 can be provided through various input devices as indicated in block 1130. Such input devices include, but are not limited to, (i) a radio frequency (RF) portion that receives an RF signal transmitted, for example, over the air by a broadcaster, (ii) a Component (COMP) input terminal (or a set of COMP input terminals), (iii) a Universal Serial Bus (USB) input terminal, and/or (iv) a High Definition Multimedia Interface (HDMI) input terminal. Other examples, not shown in FIG. 10, include composite video.

In various embodiments, the input devices of block 1130 have associated respective input processing elements as known in the art. For example, the RF portion can be associated with elements suitable for (i) selecting a desired frequency (also referred to as selecting a signal, or band-limiting a signal to a band of frequencies), (ii) downconverting the selected signal, (iii) band-limiting again to a narrower band of frequencies to select (for example) a signal frequency band which can be referred to as a channel in certain embodiments, (iv) demodulating the downconverted and band-limited signal, (v) performing error correction, and (vi) demultiplexing to select the desired stream of data packets. The RF portion of various embodiments includes one or more elements to perform these functions, for example, frequency selectors, signal selectors, band-limiters, channel selectors, filters, downconverters, demodulators, error correctors, and demultiplexers. The RF portion can include a tuner that performs various of these functions, including, for example, downconverting the received signal to a lower frequency (for example, an intermediate frequency or a near-baseband frequency) or to baseband. In one set-top box embodiment, the RF portion and its associated input processing element receives an RF signal transmitted over a wired (for example, cable) medium, and performs frequency selection by filtering, downconverting, and filtering again to a desired frequency band. Various embodiments rearrange the order of the above-described (and other) elements, remove some of these elements, and/or add other elements performing similar or different functions. Adding elements can include inserting elements in between existing elements, such as, for example, inserting amplifiers and an analog-to-digital converter. In various embodiments, the RF portion includes an antenna.

Additionally, the USB and/or HDMI terminals can include respective interface processors for connecting system 1000 to other electronic devices across USB and/or HDMI connections. It is to be understood that various aspects of input processing, for example, Reed-Solomon error correction, can be implemented, for example, within a separate input processing IC or within processor 1010 as necessary. Similarly, aspects of USB or HDMI interface processing can be implemented within separate interface ICs or within processor 1010 as necessary. The demodulated, error corrected, and demultiplexed stream is provided to various processing elements, including, for example, processor 1010, and encoder/decoder 1030 operating in combination with the memory and storage elements to process the datastream as necessary for presentation on an output device.

Various elements of system 1000 can be provided within an integrated housing, Within the integrated housing, the various elements can be interconnected and transmit data therebetween using suitable connection arrangement 1140, for example, an internal bus as known in the art, including the Inter-IC (I2C) bus, wiring, and printed circuit boards.

The system 1000 includes communication interface 1050 that enables communication with other devices via communication channel 1060. The communication interface 1050 can include, but is not limited to, a transceiver configured to transmit and to receive data over communication channel 1060. The communication interface 1050 can include, but is not limited to, a modem or network card and the communication channel 1060 can be implemented, for example, within a wired and/or a wireless medium.

Data is streamed, or otherwise provided, to the system 1000, in various embodiments, using a wireless network such as a Wi-Fi network, for example IEEE 802.11 (IEEE refers to the Institute of Electrical and Electronics Engineers). The Wi-Fi signal of these embodiments is received over the communications channel 1060 and the communications interface 1050 which are adapted for Wi-Fi communications. The communications channel 1060 of these embodiments is typically connected to an access point or router that provides access to external networks including the Internet for allowing streaming applications and other over-the-top communications. Other embodiments provide streamed data to the system 1000 using a set-top box that delivers the data over the HDMI connection of the input block 1130. Still other embodiments provide streamed data to the system 1000 using the RF connection of the input block 1130. As indicated above, various embodiments provide data in a non-streaming manner. Additionally, various embodiments use wireless networks other than Wi-Fi, for example a cellular network or a Bluetooth network.

The system 1000 can provide an output signal to various output devices, including a display 1100, speakers 1110, and other peripheral devices 1120. The display 1100 of various embodiments includes one or more of, for example, a touchscreen display, an organic light-emitting diode (OLED) display, a curved display, and/or a foldable display. The display 1100 can be for a television, a tablet, a laptop, a cell phone (mobile phone), or other device. The display 1100 can also be integrated with other components (for example, as in a smart phone), or separate (for example, an external monitor for a laptop). The other peripheral devices 1120 include, in various examples of embodiments, one or more of a stand-alone digital video disc (or digital versatile disc) (DVR, for both terms), a disk player, a stereo system, and/or a lighting system. Various embodiments use one or more peripheral devices 1120 that provide a function based on the output of the system 1000. For example, a disk player performs the function of playing the output of the system 1000.

In various embodiments, control signals are communicated between the system 1000 and the display 1100, speakers 1110, or other peripheral devices 1120 using signaling such as AV.Link, Consumer Electronics Control (CEC), or other communications protocols that enable device-to-device control with or without user intervention. The output devices can be communicatively coupled to system 1000 via dedicated connections through respective interfaces 1070, 1080, and 1090. Alternatively, the output devices can be connected to system 1000 using the communications channel 1060 via the communications interface 1050.

The display 1100 and speakers 1110 can be integrated in a single unit with the other components of system 1000 in an electronic device such as, for example, a television. In various embodiments, the display interface 1070 includes a display driver, such as, for example, a timing controller (T Con) chip.

The display 1100 and speaker 1110 can alternatively be separate from one or more of the other components, for example, if the RF portion of input 1130 is part of a separate set-top box. In various embodiments in which the display 1100 and speakers 1110 are external components, the output signal can be provided via dedicated output connections, including, for example, HDMI ports, USB ports, or COMP outputs.

The embodiments can be carried out by computer software implemented by the processor 1010 or by hardware, or by a combination of hardware and software. As a non-limiting example, the embodiments can be implemented by one or more integrated circuits. The memory 1020 can be of any type appropriate to the technical environment and can be implemented using any appropriate data storage technology, such as optical memory devices, magnetic memory devices, semiconductor-based memory devices, fixed memory, and removable memory, as non-limiting examples. The processor 1010 can be of any type appropriate to the technical environment, and can encompass one or more of microprocessors, general purpose computers, special purpose computers, and processors based on a multi-core architecture, as non-limiting examples.

Various implementations involve decoding. "Decoding", as used in this application, can encompass all or part of the processes performed, for example, on a received encoded sequence in order to produce a final output suitable for display. In various embodiments, such processes include one or more of the processes typically performed by a decoder, for example, entropy decoding, inverse quantization, inverse transformation, and differential decoding. In various embodiments, such processes also, or alternatively, include processes performed by a decoder of various implementations described in this application, for example, determining inter prediction including GBI weighting in BIO process and in asymmetric bi-prediction.

As further examples, in one embodiment "decoding" refers only to entropy decoding, in another embodiment "decoding" refers only to differential decoding, and in another embodiment "decoding" refers to a combination of entropy decoding and differential decoding. Whether the phrase "decoding process" is intended to refer specifically to a subset of operations or generally to the broader decoding process will be clear based on the context of the specific descriptions and is believed to be well understood by those skilled in the art.

Various implementations involve encoding. In an analogous way to the above discussion about "decoding", "encoding" as used in this application can encompass all or part of the processes performed, for example, on an input video sequence in order to produce an encoded bitstream. In various embodiments, such processes include one or more of the processes typically performed by an encoder, for example, partitioning, differential encoding, transformation, quantization, and entropy encoding. In various embodiments, such processes also, or alternatively, include processes performed by an encoder of various implementations described in this application, for example, determining inter prediction including GBI weighting in BIO process and in asymmetric bi-prediction.

As further examples, in one embodiment "encoding" refers only to entropy encoding, in another embodiment "encoding" refers only to differential encoding, and in another embodiment "encoding" refers to a combination of differential encoding and entropy encoding. Whether the phrase "encoding process" is intended to refer specifically to a subset of operations or generally to the broader encoding process will be clear based on the context of the specific descriptions and is believed to be well understood by those skilled in the art.

Note that the syntax elements as used herein are descriptive terms. As such, they do not preclude the use of other syntax element names.

When a figure is presented as a flow diagram, it should be understood that it also provides a block diagram of a corresponding apparatus. Similarly, when a figure is presented as a block diagram, it should be understood that it also provides a flow diagram of a corresponding method/process.

The implementations and aspects described herein can be implemented in, for example, a method or a process, an apparatus, a software program, a data stream, or a signal. Even if only discussed in the context of a single form of implementation (for example, discussed only as a method), the implementation of features discussed can also be implemented in other forms (for example, an apparatus or program). An apparatus can be implemented in, for example, appropriate hardware, software, and firmware. The methods can be implemented in, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

Reference to "one embodiment" or "an embodiment" or "one implementation" or "an implementation", as well as other variations thereof, means that a particular feature, structure, characteristic, and so forth described in connection with the embodiment is included in at least one embodiment. Thus, the appearances of the phrase "in one embodiment" or "in an embodiment" or "in one implementation" or "in an implementation", as well any other variations, appearing in various places throughout this application are not necessarily all referring to the same embodiment.

Additionally, this application may refer to "determining" various pieces of information. Determining the information can include one or more of, for example, estimating the information, calculating the information, predicting the information, or retrieving the information from memory.

Further, this application may refer to "accessing" various pieces of information. Accessing the information can include one or more of, for example, receiving the information, retrieving the information (for example, from memory), storing the information, moving the information, copying the information, calculating the information, determining the information, predicting the information, or estimating the information.

Additionally, this application may refer to "receiving" various pieces of information. Receiving is, as with "accessing", intended to be a broad term. Receiving the information can include one or more of, for example, accessing the information, or retrieving the information (for example, from memory). Further, "receiving" is typically involved, in one way or another, during operations such as, for example, storing the information, processing the information, transmitting the information, moving the information, copying the information, erasing the information, calculating the information, determining the information, predicting the information, or estimating the information.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as is clear to one of ordinary skill in this and related arts, for as many items as are listed.

Also, as used herein, the word "signal" refers to, among other things, indicating something to a corresponding decoder. For example, in certain embodiments the encoder signals a particular one of a plurality of parameters for enabling weighting in the inter prediction process, for instance the bit depth considered in the shifting. In this way, in an embodiment the same parameter is used at both the encoder side and the decoder side. Thus, for example, an encoder can transmit (explicit signaling) a particular parameter to the decoder so that the decoder can use the same particular parameter. Conversely, if the decoder already has the particular parameter as well as others, then signaling can be used without transmitting (implicit signaling) to simply allow the decoder to know and select the particular parameter. By avoiding transmission of any actual functions, a bit savings is realized in various embodiments. It is to be appreciated that signaling can be accomplished in a variety of ways. For example, one or more syntax elements, flags, and so forth are used to signal information to a corresponding decoder in various embodiments. While the preceding relates to the verb form of the word "signal", the word "signal" can also be used herein as a noun.

As will be evident to one of ordinary skill in the art, implementations can produce a variety of signals formatted to carry information that can be, for example, stored or transmitted. The information can include, for example, instructions for performing a method, or data produced by one of the described implementations. For example, a signal can be formatted to carry the bitstream of a described embodiment. Such a signal can be formatted, for example, as an electromagnetic wave (for example, using a radio frequency portion of spectrum) or as a baseband signal. The formatting can include, for example, encoding a data stream and modulating a carrier with the encoded data stream. The information that the signal carries can be, for example, analog or digital information. The signal can be transmitted over a variety of different wired or wireless links, as is known. The signal can be stored on a processor-readable medium.

We describe a number of embodiments. Features of these embodiments can be provided alone or in any combination, across various claim categories and types. Further, embodiments can include one or more of the following features, devices, or aspects, alone or in any combination, across various claim categories and types:

Modifying the inter prediction process for enabling weighting parameters applied in the decoder and/or encoder.

Modifying the bi-directional optical flow in inter prediction process for adaptation to Generalized Bi-prediction weighting applied in the decoder and/or encoder.

Enabling bitdepth shifting in the modified bi-directional optical flow in the decoder and/or encoder.

Enabling approximating/quantifying the weighting in the modified bi-directional optical flow in the decoder and/or encoder.

Using predictions weighting instead of the predictions sample weighting in the modified bi-directional optical flow in the decoder and/or encoder.

Modifying and/or unifying the weighting for both GBI and asymmetric bi-prediction in inter prediction process applied in the decoder and/or encoder.

Inserting in the signalling syntax elements that enable the decoder to identify the weighting in the modified inter prediction method to use.

Selecting, based on these syntax elements, the modified inter prediction method to apply at the decoder.

A bitstream or signal that includes one or more of the described syntax elements, or variations thereof.

A bitstream or signal that includes syntax conveying information generated according to any of the embodiments described.

Inserting in the signaling syntax elements that enable the decoder to modify the inter prediction method in a manner corresponding to that used by an encoder.

Creating and/or transmitting and/or receiving and/or decoding a bitstream or signal that includes one or more of the described syntax elements, or variations thereof.

Creating and/or transmitting and/or receiving and/or decoding according to any of the embodiments described.

A method, process, apparatus, medium storing instructions, medium storing data, or signal according to any of the embodiments described.

A TV, set-top box, cell phone, tablet, or other electronic device that performs adaptation of inter prediction method according to any of the embodiments described.

A TV, set-top box, cell phone, tablet, or other electronic device that performs adaptation of inter prediction method according to any of the embodiments described, and that displays (e.g. using a monitor, screen, or other type of display) a resulting image.

A TV, set-top box, cell phone, tablet, or other electronic device that selects (e.g. using a tuner) a channel to receive a signal including an encoded image, and performs adaptation of inter prediction method according to any of the embodiments described.

A TV, set-top box, cell phone, tablet, or other electronic device that receives (e.g. using an antenna) a signal over the air that includes an encoded image, and performs adaptation of inter prediction method according to any of the embodiments described.

The invention claimed is:

1. A method, comprising:
performing sample-wise motion refinement using bi-directional optical flow of a block-wise motion compensated prediction of at least a part of an image, the block-wise motion compensated prediction being a bi-prediction;
wherein the bi-directional optical flow comprises bit depth shifting unequal weights used in the bi-prediction of the at least one part of the image by a bit depth of the unequal weights and processing a sample-wise motion refinement correction on a bit depth increased by the bit depth of the unequal weights; and
encoding or decoding the at least a part of the image using the sample-wise motion refined prediction.

2. The method of claim 1, wherein the bi-prediction using unequal weights is one of a generalized bi-prediction, a bi-prediction with coding units level weights, a bi-prediction with image level weights, or a bi-prediction with an image distance based weights.

3. A method, comprising:
performing sample-wise motion refinement using bi-directional optical flow of a block-wise motion compensated prediction of at least a part of an image, the block-wise motion compensated prediction being a bi-prediction;
wherein the bi-directional optical flow comprises quantifying unequal weights used in the bi-prediction of the at least one part of the image; and
encoding or decoding the at least a part of the image using the sample-wise motion refined prediction.

4. The method of claim 1, wherein the bi-directional optical flow comprises deriving modified weights to apply to the block-wise motion compensated prediction of the part of the image from the unequal weights used in the bi-prediction.

5. An apparatus, comprising,
a memory; and
one or more processors configured to:
perform sample-wise motion refinement using bi-directional optical flow of a block-wise motion compensated prediction of at least a part of an image, the bi-directional optical flow comprising a bit depth shift of unequal weights used in a bi-prediction of the block-wise motion compensated prediction by a bit depth of the unequal weights and a sample-wise motion refinement correction processed on a bit depth increased by the bit depth of the unequal weights; and
encode or decode the at least a part of the image using the sample-wise motion refined prediction.

6. The apparatus of claim 5, wherein the bi-prediction using unequal weights is one of a generalized bi-prediction, a bi-prediction with coding units level weights, a bi-prediction with image level weights, or a bi-prediction with an image distance based weights.

7. An apparatus, comprising:
a memory; and
one or more processors configured to:
perform sample-wise motion refinement using bi-directional optical flow of a block-wise motion compensated prediction of at least a part of an image, the block-wise motion compensated prediction being a bi-prediction;
wherein the bi-directional optical flow comprises a quantification of the unequal weights used in the bi-prediction of the at least one part of the image; and
encode or decode the at least a part of the image using the sample-wise motion refined prediction.

8. The apparatus of claim 5, wherein the bi-directional optical flow comprises derivation of modified weights to apply to the block-wise motion compensated prediction of the part of the image from the unequal weights used in bi-prediction.

9. A non-transitory computer readable medium having stored thereon instructions that when executed by one or more processors perform the method of claim 1.

10. A non-transitory computer readable medium containing data content generated according to the method of claim 3 for playback using a processor.

11. A non-transitory computer readable medium containing data content generated according to the method of claim 1 for playback using a processor.

12. The method of claim 1, wherein the bi-directional optical flow comprises quantifying the unequal weights used in the bi-prediction.

13. The method of claim 3, wherein the bi-prediction using unequal weights is one of a generalized bi-prediction, a bi-prediction with coding units level weights, a bi-prediction with image level weights, or a bi-prediction with an image distance based weights.

14. The method of claim 3, wherein the bi-directional optical flow comprises bit depth shifting the unequal weights used in the bi-prediction.

15. The method of claim 3, wherein the bi-directional optical flow comprises deriving modified weights to apply to the block-wise motion compensated prediction of the part of the image from the unequal weights used in the bi-prediction.

16. A non-transitory computer readable medium having stored thereon instructions that when executed by one or more processors perform the method of claim 3.

17. The apparatus of claim 5, wherein the bi-directional optical flow comprises a quantification of the unequal weights used in the bi-prediction.

18. The apparatus of claim 7, wherein the bi-prediction using unequal weights is one of a generalized bi-prediction, a bi-prediction with coding units level weights, a bi-prediction with image level weights, or a bi-prediction with an image distance-based weights.

19. The apparatus of claim 7, wherein the bi-directional optical flow comprises a bit depth shift of the unequal weights used in the bi-prediction.

20. The apparatus of claim 7, wherein the bi-directional optical flow comprises derivation of modified weights to apply to the block-wise motion compensated prediction of the part of the image from the unequal weights used in bi-prediction.

* * * * *